United States Patent
Gouillou et al.

(10) Patent No.: US 10,241,589 B2
(45) Date of Patent: *Mar. 26, 2019

(54) CONTROL DEVICE OF A COMMUNICATION SYSTEM OF AN AIRCRAFT

(71) Applicant: Airbus Operations SAS, Toulouse (FR)

(72) Inventors: Jerome Gouillou, Colomiers (FR); Christine Charbonnier, Saint Lys (FR); Aymeric Perrin, Blagnac (FR)

(73) Assignee: AIRBUS OPERATIONS SAS, Toulouse (FR)

(*) Notice: Subject to any disclaimer, the term of this patent is extended or adjusted under 35 U.S.C. 154(b) by 100 days.

This patent is subject to a terminal disclaimer.

(21) Appl. No.: 15/425,306

(22) Filed: Feb. 6, 2017

(65) Prior Publication Data

US 2017/0228037 A1  Aug. 10, 2017

(30) Foreign Application Priority Data

Feb. 10, 2016 (FR) .................................. 16 51067

(51) Int. Cl.
*G06F 3/02* (2006.01)
*G06F 3/0488* (2013.01)
(Continued)

(52) U.S. Cl.
CPC ............ *G06F 3/02* (2013.01); *B64D 11/0015* (2013.01); *G06F 3/04886* (2013.01); *G06F 3/14* (2013.01);
(Continued)

(58) Field of Classification Search
CPC ... G06F 3/02; G06F 3/162; G06F 3/14; G06F 3/165; G06F 3/04886; G06F 3/04847;
(Continued)

(56) References Cited

U.S. PATENT DOCUMENTS

| | | | |
|---|---|---|---|
| 6,559,753 B1* | 5/2003 | Uchida | H04H 20/59 340/7.59 |
| 2002/0119758 A1* | 8/2002 | Gouillou | G08G 5/0008 455/74 |

(Continued)

FOREIGN PATENT DOCUMENTS

| | | |
|---|---|---|
| EP | 2765499 | 8/2014 |
| FR | 2821468 | 8/2002 |
| FR | 2907996 | 5/2008 |

OTHER PUBLICATIONS

French Search Report, dated Sep. 28, 2016, priority document.

*Primary Examiner* — Amit Chatly
(74) *Attorney, Agent, or Firm* — Greer, Burns & Crain, Ltd.

(57) ABSTRACT

The control device of a communication system of an aircraft having a predefined number of communication channels comprises a processing unit and sets of buttons each associated with a communication channel and comprising a button for setting sound volume, a reception button and a transmission button. The number of sets of buttons is at least equal to two and less than the predefined number of communication channels of the communication system. The device comprises display areas on a display screen, a display area being associated with each set of buttons and provided to display at least the name of the communication channel associated with the set of buttons. The processing unit is configured to configure the association between each of the sets of buttons and the communication channel associated with this set of buttons according to actions of a user on at least one interactive element of the device.

10 Claims, 8 Drawing Sheets

(51) Int. Cl.
*G06F 3/16* (2006.01)
*G06F 3/14* (2006.01)
*B64D 11/00* (2006.01)
*G06F 3/033* (2013.01)
*G06F 3/0482* (2013.01)
*G06F 3/0484* (2013.01)

(52) U.S. Cl.
CPC .............. *G06F 3/162* (2013.01); *G06F 3/165* (2013.01); *G06F 3/033* (2013.01); *G06F 3/0482* (2013.01); *G06F 3/04847* (2013.01); *G06F 3/04883* (2013.01)

(58) Field of Classification Search
CPC .... G06F 3/0482; G06F 3/033; G06F 3/04883; B64D 11/0015
See application file for complete search history.

(56) References Cited

U.S. PATENT DOCUMENTS

| | | | |
|---|---|---|---|
| 2002/0119759 A1 | 8/2002 | Gouillou | |
| 2004/0103119 A1* | 5/2004 | Fukui | G06F 3/0238 |
| 2010/0094484 A1* | 4/2010 | Cornell | G01C 23/00 |
| | | | 701/3 |
| 2015/0026638 A1* | 1/2015 | Kim | G06F 1/1626 |
| | | | 715/810 |
| 2015/0261379 A1 | 9/2015 | Kneuper et al. | |
| 2017/0017463 A1* | 1/2017 | Zhou | G06F 3/167 |
| 2017/0225786 A1* | 8/2017 | Chouteau | B64D 11/0015 |

* cited by examiner

CONTROL DEVICE OF A COMMUNICATION SYSTEM OF AN AIRCRAFT

CROSS-REFERENCES TO RELATED APPLICATIONS

This application claims the benefit of the French patent application No. 1651067 filed on Feb. 10, 2016, the entire disclosures of which are incorporated herein by way of reference.

BACKGROUND OF THE INVENTION

The present invention relates to a control device of a communication system of an aircraft, notably a transport airplane. In the context of the present invention, a communication system is understood to be a set of standard communication equipment items, making it possible to implement and control audio communications on board the aircraft. These audio communications are, in particular, all those that the pilots of the aircraft can have, notably with air traffic control (via VHF channels or HF channels for example), with the airlines (via VHF channels or even a channel corresponding to a telephone link, for example over the "SATCOM" network), with the crew in the passenger cabin of the aircraft (via a channel corresponding to a cabin intercom), with the passengers (via a channel corresponding to a public address link, between pilots (via a cockpit intercommunication channel), etc.

To control such a communication system (that is to say all the communication equipment items), the pilots generally use a standard device of ACP (Audio Control Panel) type. This device of ACP type makes it possible to mix several communication channels in reception: radio communication (VHF, HF, etc.), SATCOM telephone link, cabin intercom, etc. This mixing enables pilots to listen simultaneously to several channels, with the possibility of setting the sound volume of each of the channels by means of buttons for setting sound volume of the device of ACP type. The ACP device further allows a user, such as a pilot, to select a communication channel for transmission (one channel at a time).

In addition to the device of ACP type, the pilot usually has a frequency setting device of RMP (Radio Management Panel) type, of RCP (Radio Control Panel) type or of RTP (Radio Tuning Panel) type, for setting the radio frequencies of VHF and HF radio communication channels. He or she can also manually select or set telephone numbers, via the SATCOM system for example, generally from a page that can be displayed on a device of MCDU (Multipurpose Control and Display Unit) type, or even from the frequency setting device.

The document FR2.821.468A1 describes a control device of a communication system incorporating the functionalities of a device of ACP type, of a device of RMP (or RCP or RTP) type, as well as telephone number selection or setting.

The device of ACP type, whether independent or incorporated in a control device such as that described in the document FR2.821.468A1, comprises a set of buttons for each communication channel of the controlled communication system. This set of buttons includes a button for setting sound volume (generally a rotary knob), a listening button making it possible to select or deselect listening to the corresponding communication channel and a transmission button making it possible to select or deselect the corresponding communication channel for transmission. In the case of a conventional communication system comprising, for example, two VHF channels, two HF channels, two channels corresponding to SATCOM telephone links, a cabin intercom channel, a public address channel and a cockpit intercommunication channel, the device of ACP type comprises nine sets of buttons corresponding to the above-mentioned nine communication channels. This high number of buttons results in a significant footprint of the sets of buttons on the front panel of the device of ACP type. That also contributes to increasing the weight of the device of ACP type. Furthermore, the cost of the buttons, in particular of the rotary knobs, is high.

SUMMARY OF THE INVENTION

An aim of the present invention is notably to provide a solution to these problems. It relates to a control device of a communication system of an aircraft, the communication system having a predefined number of communication channels, the device comprising a processing unit, a display screen and sets of buttons, each set of buttons being associated with a communication channel and comprising:
  a button for setting sound volume;
  a so-called reception button, provided for activating and/or deactivating listening to the communication channel associated with the set of buttons; and
  a so-called transmission button, provided for selecting and/or deselecting the communication channel associated with the set of buttons for transmission.
This device is noteworthy in that:
  the number of sets of buttons is at least equal to two and less than the predefined number of communication channels of the communication system,
  the device comprises display areas on the display screen, a display area being associated with each set of buttons, the display area associated with a set of buttons being arranged facing at least one button of the set of buttons and provided to display at least the name of the communication channel associated with the set of buttons, and
  the processing unit is configured to configure the association between each of the sets of buttons and the communication channel associated with this set of buttons according to actions of a user on at least one interactive element of the device.

Thus, the control device of the communication system comprises a number of sets of buttons, less than the number of communication channels likely to be controlled by the control device. That makes it possible to reduce the footprint, the cost and the weight of the control device. Furthermore, since the association between a set of buttons and the communication channel associated with this set of buttons can be configured by the processing unit, if a new communication channel is added to the communication system, the control device can continue to be used, subject to a simple updating of its software in order to take account of this new communication channel. The fact that the number of sets of buttons is at least equal to two makes it possible for a pilot using the control device to be able to easily and quickly control several communication channels with which he or she has to interact at a given instant, without requiring frequent reconfigurations of the channels associated with these sets of buttons.

According to particular embodiments that can be taken into account in isolation or in combination:
  the at least one interactive element corresponds to the transmission button of the communication channel associated with the set of buttons. According to a first alternative, the transmission button of the communication channel associated with the set of buttons is an electromechanical button and the processing unit is configured to commence configuration of the communication channel associated with the set of buttons concerned when this electromechanical button is pressed for a duration greater than a predetermined value. According to a second alternative, the transmission button of the communication channel associated with the set of buttons corresponds to a touch surface superimposed on the display area associated with the set of buttons concerned and the processing unit is configured to commence configuration of the communication channel associated with the set of buttons concerned when a user performs a specific gesture on this touch surface;

the device is linked to a pointing device and the processing unit is configured to commence configuration of the association between a set of buttons and the communication channel associated with this set of buttons when a user interacts with the display area associated with the set of buttons concerned by means of the pointing device;

the device comprises a set of keys, called navigation keys, distinct from the buttons of the various sets of buttons, and the processing unit is configured to commence configuration of the association between a set of buttons and the communication channel associated with this set of buttons when a user presses on a navigation key;

the processing unit is configured to display on the display screen a so-called configuration menu, on request from a user, this configuration menu allowing the user to choose from several predefined configurations of the channels associated with the various sets of buttons;

the processing unit is configured to allow a user to parameterize at least one of the predefined configurations;

the device further comprises:
a set of so-called call buttons, this set of call buttons comprising at least one transmission button, and
a display area on the display screen, this display area being associated with the set of call buttons and arranged facing the set of call buttons, and the processing unit is configured to display an indication in the display area associated with the set of call buttons when the communication system receives a call over a communication channel with which no set of buttons is associated and to select this communication channel for transmission following an action of a user on the transmission button of the set of call buttons.

The invention also relates to an aircraft comprising a control device of a communication system as mentioned above.

BRIEF DESCRIPTION OF THE DRAWINGS

The invention will be better understood on reading the following description and on studying the attached figures.

FIG. 1b is a detailed view of a part of FIG. 1a.

FIG. 2b is a detailed view of a part of FIG. 2a.

DETAILED DESCRIPTION OF THE PREFERRED EMBODIMENTS

Figure 10:
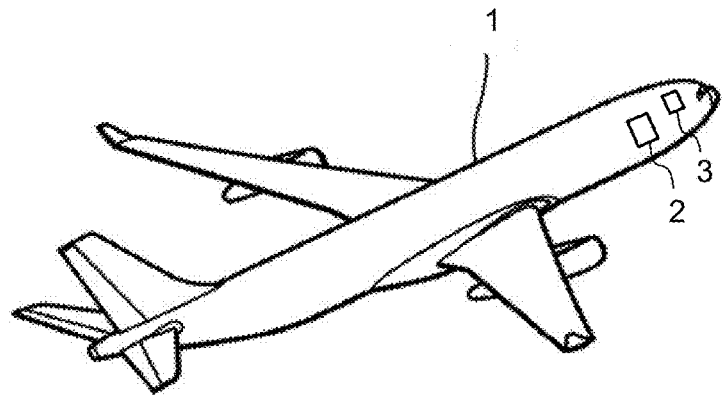
FIG. 10 represents an aircraft comprising a control device of a communication system.
Figure 11:
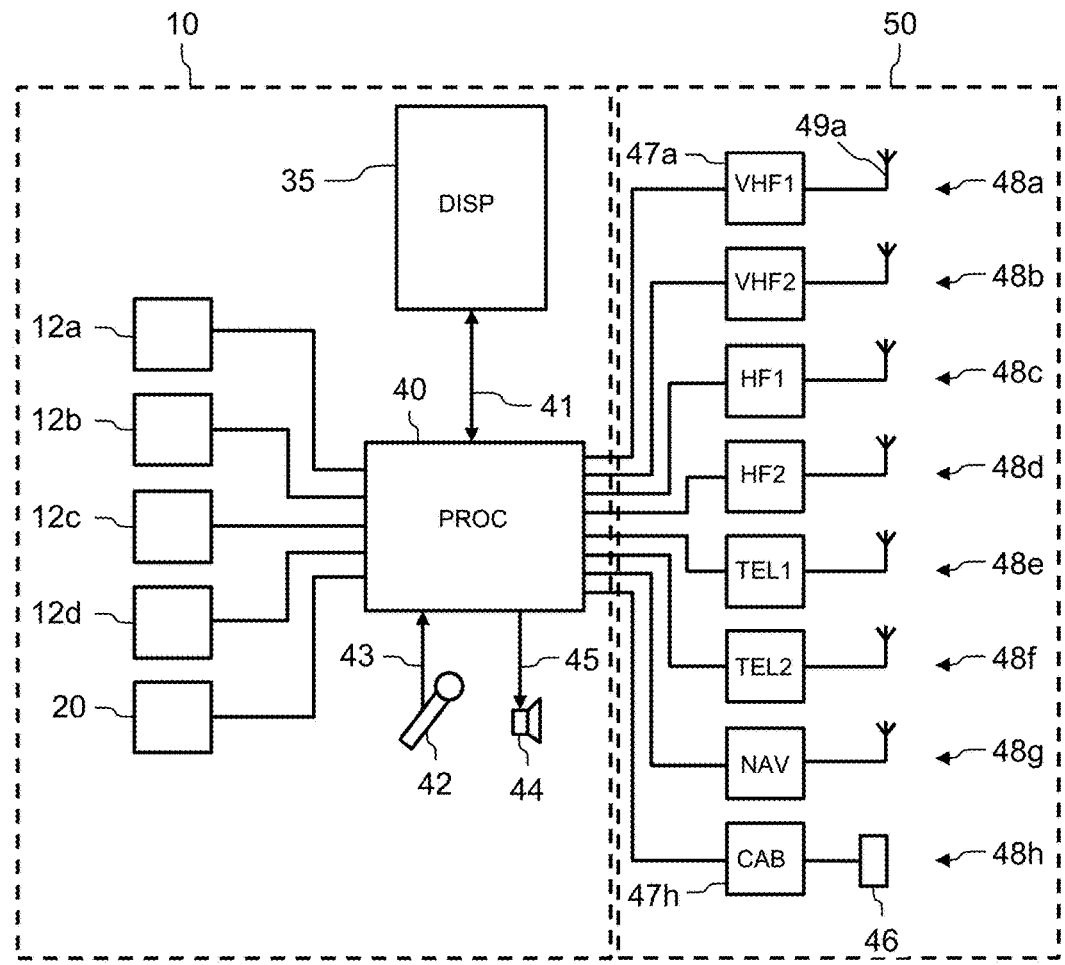
FIG. 11 schematically represents a control device of a communication system of an aircraft, linked to such a communication system.

In an aircraft, such as the aircraft 1 represented in FIG. 10, the control device 10 of a communication system 50 of the aircraft, represented in FIG. 11, comprises a processing unit 40 (denoted PROC in the figure), sets of buttons 12a, 12b, 12c and 12d linked to the processing unit 40, a display screen 35 (denoted DISP in the figure) linked to the processing unit by a link 41, a microphone 42 linked to the processing unit by a link 43 and a loudspeaker 44 linked to the processing unit by a link 45. Preferably, the processing unit 40 comprises a microprocessor or a microcontroller and at least one memory. The communication system 50 comprises a set of communication channels 48a, 48b . . . 48h. These communication channels respectively comprise standard communication or radio communication equipment items 47a . . . 47h. The radio communication equipment items are linked to one or more antennas of the aircraft. For example, the equipment item 47a of VHF type (denoted VHF1 in the figure) is linked to an antenna 49a of the aircraft. In the example represented in the figure, the equipment item 47h corresponds to an equipment item allowing communications with the passenger cabin. This equipment item (denoted CAB in the figure) is linked to an intercom 46 in the passenger cabin. The different communication and/or radio communication equipment items 47a . . . 47h can notably be placed in an avionics rack 2 of the aircraft. The control device 10 is preferably located in a cockpit 3 of the aircraft. In a particular embodiment, the loudspeaker 44 corresponds to a loudspeaker (or to a pair of loudspeakers) incorporated in an audio headset of a pilot. The microphone 42 is then also incorporated in this audio headset.

The sets of buttons 12a . . . 12d are reconfigurable, that is to say they are provided to be each associated with a communication channel of the communication system of the aircraft and a user can configure the association between each set of buttons and the communication channel associated with this set of buttons. Each of the sets of buttons 12a . . . 12d comprises a button for setting sound volume, respectively 14a . . . 14d and a reception button, respectively 15a . . . 15d. The reception button is provided to activate or deactivate listening to the communication channel with which the set of buttons to which it belongs is associated, by successive presses on this reception button. This reception button can be located on an end of the button for setting sound volume, which allows for a greater physical integration of the buttons and therefore a space saving. That also allows for a better ergonomy of use, in as much as the button for setting sound volume and the reception button of one and the same communication channel are located together. A display area, respectively 18a . . . 18d, defined on the display screen 35, is associated with each of the sets of buttons, respectively 12a . . . 12d. The display area associated with a set of buttons is arranged facing at least one button of the set of buttons and it is provided to display at least the name of the communication channel associated with the set of buttons.

Figure 1A:
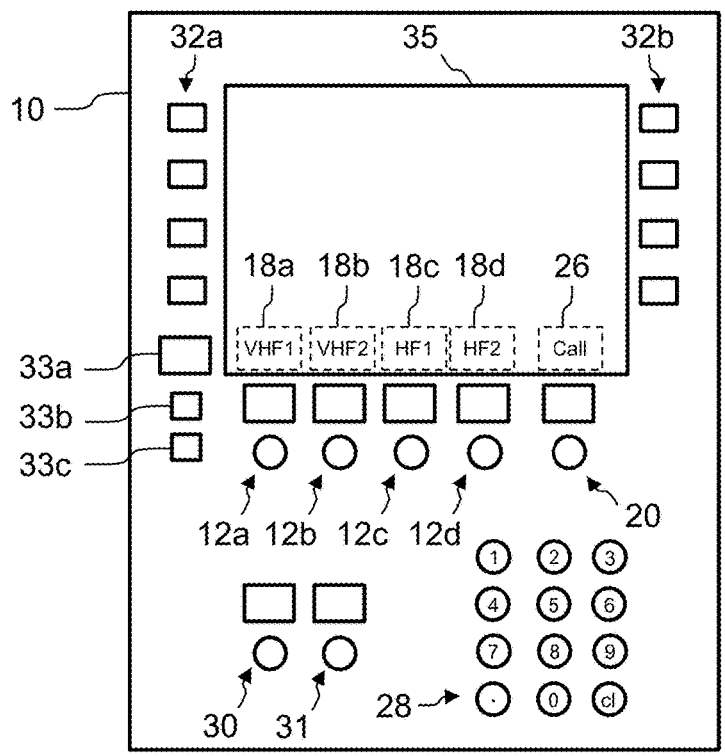
FIG. 1a illustrates a control device of a communication system of an aircraft, according to a first embodiment of the invention.
Figure 1B:
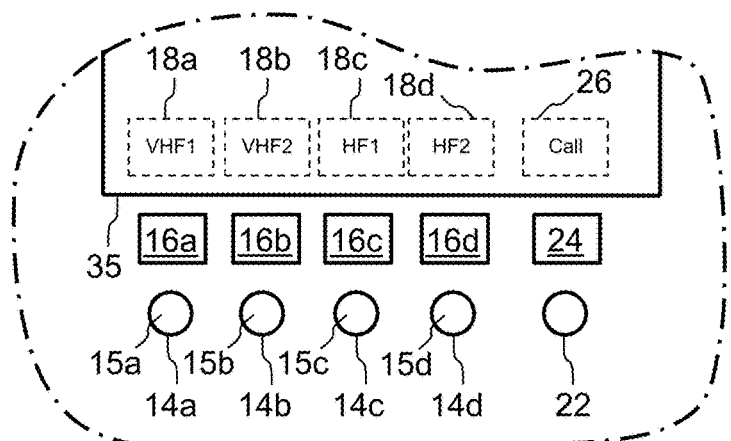

In a first embodiment represented in FIGS. 1a and 1b, each set of buttons 12a . . . 12b further comprises a transmission button, respectively 16a . . . 16d. This transmission button corresponds, for example, to an electromechanical button situated in proximity to the volume setting button. The transmission button is provided to select and/or deselect the communication channel associated with the set of buttons for transmission, just one communication channel being able to be active in transmission at a given instant. Preferably, although not necessarily, the display area 18a . . . 18d associated with a set of buttons 12a . . . 12d is situated facing the transmission button 16a . . . 16d of the set of buttons, as represented in FIG. 1b.

In operation, when a user such as a pilot of the aircraft performs an action on a button of one of the sets of buttons, the processing unit 40 conventionally accordingly controls the interactions between the microphone, the loudspeaker and the equipment items corresponding to the communication channel associated with this set of buttons. Thus, when the user presses on the reception button, the processing unit activates listening, on the loudspeaker 44, to the communication channel associated with the set of buttons. When the user presses the transmission button, the processing unit selects the communication channel associated with the set of buttons for transmission. If necessary, the processing unit deselects another communication channel previously selected for transmission, given that just one communication channel can be selected at a given instant for transmission. When a communication channel is selected for transmission, the processing unit allows the transmission of the signals from the microphone 42 to the equipment item 47a . . . 47h corresponding to the communication channel selected.

The processing unit 40 is further configured to configure the association between each of the sets of buttons 12a . . . 12d and the communication channel associated with this set of buttons, according to actions of a user on at least one interactive element of the device 10. In a particular embodiment, the interactive element corresponds to the transmission button 16a . . . 16d of the communication channel Advantageously, when a user presses for a long time (for example for longer than 2 seconds) on the transmission button of a set of buttons, the processing unit activates a configuration mode for the communication channel associated with the set of buttons. The processing unit then controls the display, on the display screen 35, of a menu or of a list allowing the user to choose the communication channel that he or she wants to associate with the set of buttons. In another particular embodiment, the device 10 comprises navigation keys 33a, 33b, 33c distinct from the sets of buttons and the interactive element corresponds to one of the keys, for example the key 33a. The processing unit is configured to commence configuration of the communication channel associated with a set of buttons when a user presses on this key. The processing unit is configured such that the user can then, initially, choose the set of buttons for which he or she wants to configure the associated communication channel (for example by means of the other navigation keys) and, secondly, choose the communication channel, for example, in a menu or in a list as described previously.

Once the communication channel is chosen by the user, the processing unit stores, in a memory, the association between the set of buttons concerned and this communication channel. The processing unit further controls the display, in the display area associated with the set of buttons, of the name of the communication channel, for example VHF1, VHF2, HF1, HF2, TEL1, TEL2, NAV or CAB.

According to a particular embodiment of the first embodiment, the control device 10 comprises sets of keys 32a, 32b situated in proximity to the display screen 35. These keys can, for example, be used conventionally to make choices in menus.

In another particular embodiment of the first embodiment, the control device 10 comprises sets of buttons 30, 31. Physically, these sets of buttons are similar to the sets of buttons 12a . . . 12d, but they are not reconfigurable: they are associated with communication channels, in a way that is preset and cannot be modified by a user. The communication channels with which these sets of non-reconfigurable buttons are associated correspond to communication channels over which a pilot of the aircraft needs to be able to interact rapidly at any instant, without requiring a reconfiguration of the association between a set of buttons and one of the channels. They can, for example, be channels corresponding to cockpit intercommunication between two pilots or to addressing the passengers (public address channel).

According to yet another particular embodiment of the first embodiment, the control device 10 comprises a keyboard 28. This keyboard makes it possible, for example, to enter numeric values, in particular for setting radio communication frequencies, for inputting telephone numbers, etc.

Figure 2A:
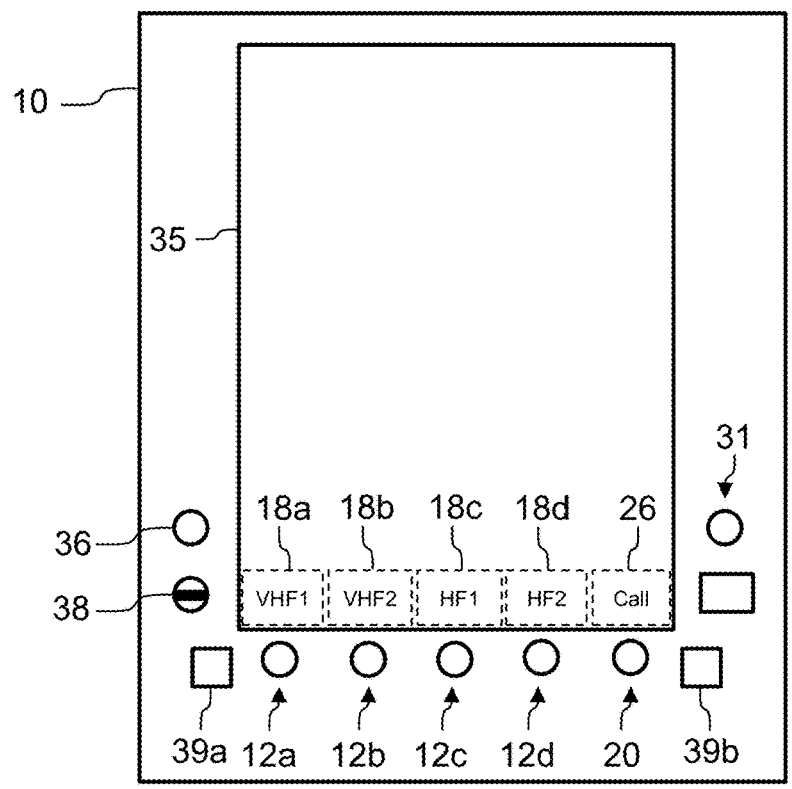
FIG. 2a illustrates a control device of a communication system of an aircraft, according to a second embodiment of the invention.
Figure 2B:
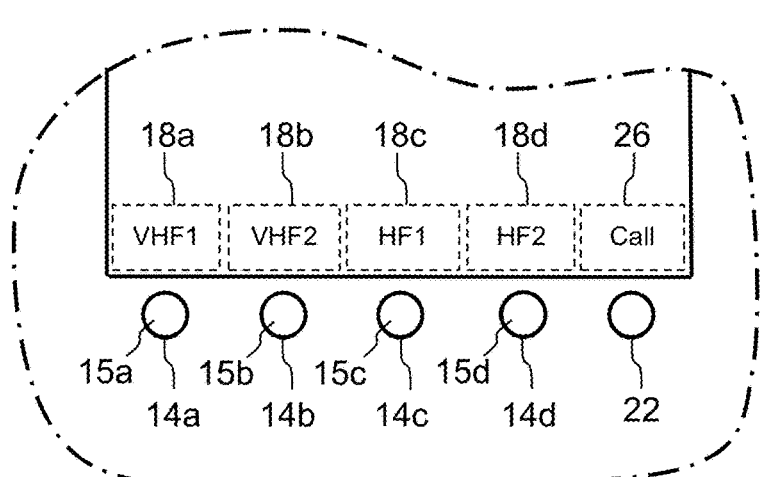

In a second embodiment represented in FIGS. 2a and 2b, the display screen 35 is a touch screen and the transmission button of the communication channel associated with each set of buttons 12a . . . 12b corresponds to a touch surface superimposed on the display area 18a . . . 18d associated with the set of buttons concerned. As in the first embodiment, the transmission button is provided to select and/or deselect the communication channel associated with the set of buttons for transmission, just one communication channel being able to be active in transmission at a given instant. Preferably, although not necessarily, the display area 18a . . . 18d associated with a set of buttons 12a . . . 12d is situated facing the volume setting button 14a . . . 14d of the set of buttons, as represented in FIG. 2b.

Figure 3A:
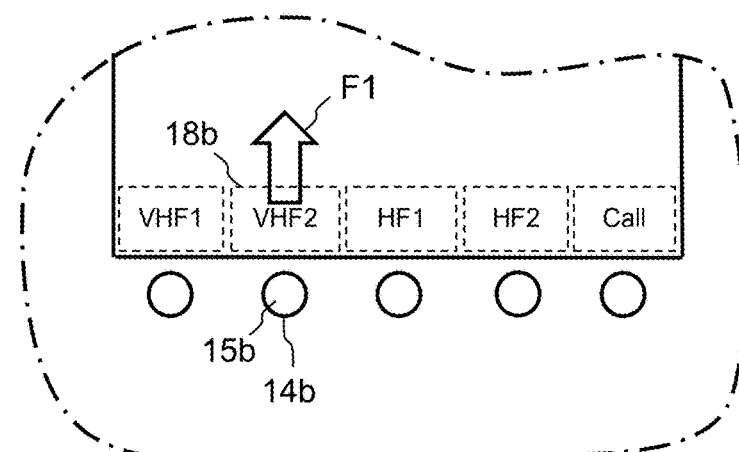
FIGS. 3a and 3b illustrate a particular way of producing the second embodiment of the invention.
Figure 3B:
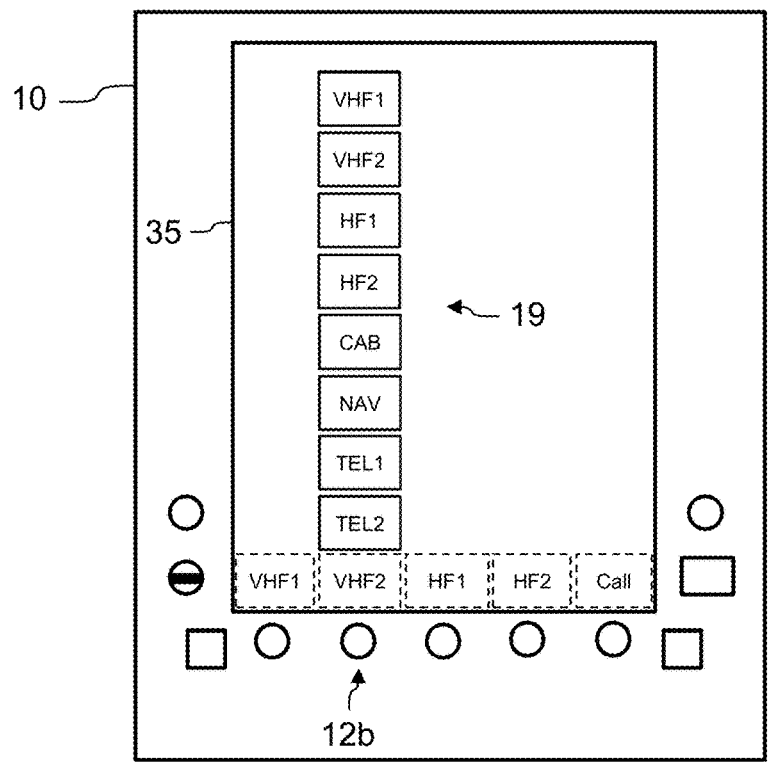

The processing unit 40 is configured to configure the communication channel associated with each set of buttons according to actions of a user on at least one interactive element of the device 10. In a particular manner, the interactive element corresponds to the transmission button of the communication channel, that is to say to the touch surface superimposed on the display area associated with the set of buttons. Advantageously, when a user performs a specific gesture on this touch surface, the processing unit commences configuration of the communication channel associated with the set of buttons concerned by activating a configuration mode for the communication channel associated with the set of buttons. In a particular embodiment, this specific gesture corresponds to a prolonged press (for example for longer than 2 seconds) on the touch surface. In another particular embodiment, this specific gesture corresponds to the dragging of a finger of the user over the touch surface, as illustrated by the arrow F1 in FIG. 3a. After the gesture has been performed by the user, the processing unit 40 controls the display, on the display screen 35, of a menu or of a list allowing the user to choose the communication channel that he or she wants to associate with the set of buttons. FIG. 3b illustrates the display, on the display screen 35, of a list 19 of the different communication channels likely to be associated with the set of buttons 12b. Since the display screen 35 is a touch screen, the user can then choose a communication channel by touching an area of the display screen in which the name of the chosen communication channel is displayed. Once the communication channel is chosen by the user, the processing unit stores, in a memory, the association between the set of buttons concerned and this communication channel. The processing unit further controls the display, in the display area associated with the set of buttons, of the name of the communication channel, for example VHF1, VHF2, HF1, HF2, TEL1, TEL2, NAV or CAB.

According to a particular embodiment of the second embodiment, the control device 10 comprises sets of buttons 31 and (36, 38). These sets of buttons are not reconfigurable: they are associated with communication channels in a preset manner and cannot be modified by a user. The communication channels with which these sets of non-reconfigurable buttons are associated corresponds to communication channels over which a pilot of the aircraft needs to be able to interact rapidly at any instant, without requiring a reconfiguration of the association between a set of buttons and one of the channels. For example, the buttons 36 and 38 are associated with the communication channel corresponding to cockpit intercommunication between two pilots and the set of buttons 31 is associated with the communication channel corresponding to passenger address (public address channel).

According to another particular embodiment of the second embodiment, the control device 10 comprises keys 39a and 39b corresponding to particular functions of the device.

According to yet another particular embodiment, not represented, of the second embodiment, the various buttons of the sets of buttons 12a . . . 12b correspond to touch surfaces of the screen 35. The control device 10 can then have no electromechanical button.

Although illustrated in the particular case of the second embodiment, the rest of the description is not limited thereto and it applies equally to the case of the first embodiment.

Advantageously, the control device 10 is linked to a pointing device and the processing unit is configured to commence configuration of the communication channel associated with the set of buttons concerned when a user interacts with the display area 18a . . . 18d associated with the set of buttons 12a . . . 12d concerned by means of the pointing device. The pointing device corresponds for example to a device of "trackball" type of a human-machine interface of the cockpit of the aircraft, for example a human-machine interface of KCCU (Keyboard and Cursor Control Unit) type. Thus, for example, a user brings up on the display screen 35 a cursor associated with the pointing device. He or she moves this cursor over the display area associated with the set of buttons for which he or she wants to reconfigure the communication channel When the cursor is on the display area, the user can then click by means of the pointing device. Since the latter is linked to the processing unit 40, the processing unit interprets this clicking action as a request from the user to commence configuration of the communication channel associated with the set of buttons concerned and it controls the display, on the display screen 35, of a menu or of a list in which or from which the user can choose a communication channel by means of the pointing device.

Figure 4:
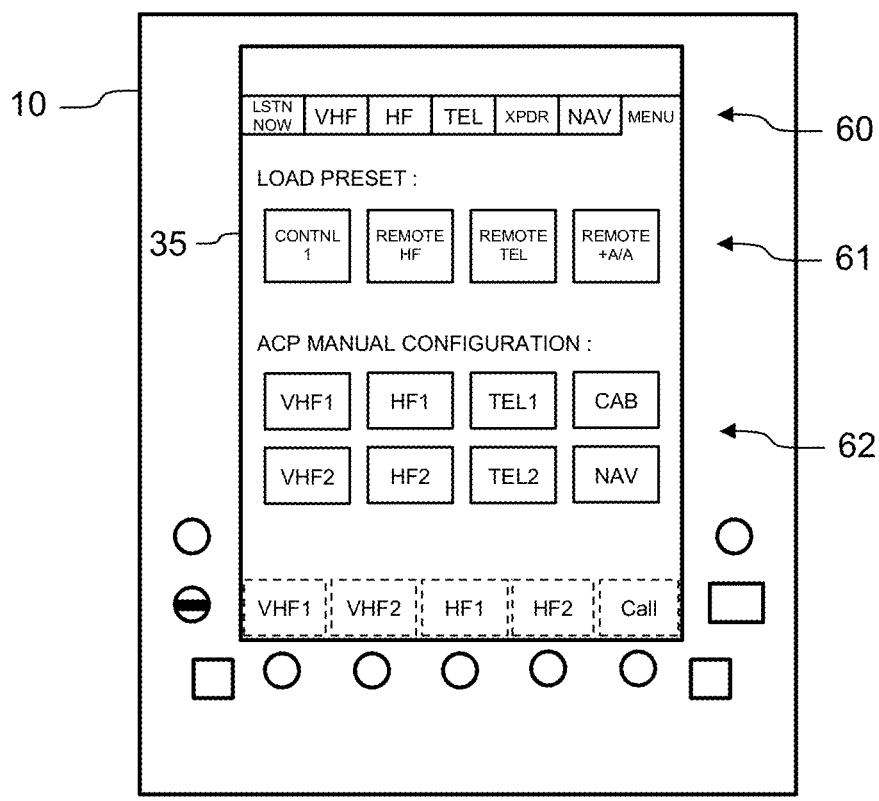
FIGS. 4, 5, 6, 7a, 7b, 8 and 9 illustrate particular embodiments of the invention.

Even more advantageously, the processing unit is configured to display, on the display screen 35, a so-called configuration menu, on request from a user, this configuration menu allowing the user to choose from several preset configurations of the channels associated with the various sets of buttons. In the example represented in FIG. 4, the screen 35 displays a list of tabs 60 in which the user can select a "Menu" tab. The tab can be selected by touch as the display screen is a touch screen. When the "Menu" tab is selected, the processing unit controls the display, on the display screen 35, of a list 61 of preset configurations (entitled "Load preset" in the figure) of the channels associated with the various sets of buttons. The list represented in the figure comprises four preset configurations entitled CONTNL1 (parameterized for continental overflight), REMOTE HF, REMOTE TEL (parameterized for ocean or desert area overflight, respectively prioritizing communications of HF type or of telephone by SATCOM type) and REMOTE +A/A (parameterized for so-called IFBP ("In Flight Broadcast Procedure") operations, simultaneously using one or more HF communication channels to communicate with air traffic control and several VHF channels to communicate respectively with air traffic control and with surrounding airplanes). The user can globally reconfigure the four sets of buttons 12a . . . 12d by choosing one of the preset configurations. In addition, in a particular embodiment, the processing unit controls the display, on the display screen 35, of a list 62 (entitled "ACP Manual configuration" in the figure) of communication channels, provided for a manual configuration of the communication channels associated with the sets of buttons 12a . . . 12d. In the case where the display screen 35 is a touch screen, the user can touch one of the items in the list 62 and drag it to one of the display areas 18a . . . 18d so as to associate the communication channel corresponding to this list item with the set of buttons with which the display area is associated. For example, the user can touch the "TEL1" item and drag it to the display area 18b. That causes the communication channel TEL1 to be associated with the set of buttons 12b, replacing the current communication channel VHF2. The processing unit stores this new configuration in a memory and it controls the display of "TEL1" in the display area 18b. The user can repeat such a procedure for each of the display areas 18a . . . 18d so as to quickly reconfigure all of the sets of buttons 12a . . . 12d from the "Menu" tab. When the display screen is not a touch screen, the user can move a list item 62 to a display area 18a . . . 18d by means of a pointing device, for example of "trackball" type. In another particular embodiment, the user can parameterize at least one of the preset configurations of the list 61 of preset configurations. For that, when the display screen is a touch screen, he or she, for example, performs a specific gesture on the display area corresponding to this preset configuration. The processing unit controls a display allowing the user to associate the communication channels from the list 62 with each of the sets of buttons 12a . . . 12d. When the user has associated the communication channels with each of the sets of buttons, the processing unit stores this preset configuration, and the latter can then be chosen by the user as indicated previously.

Figure 6:
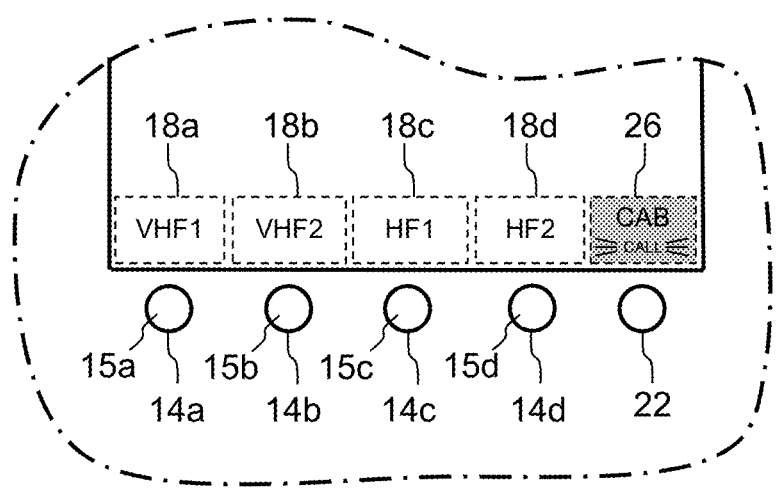
Figure 7A:
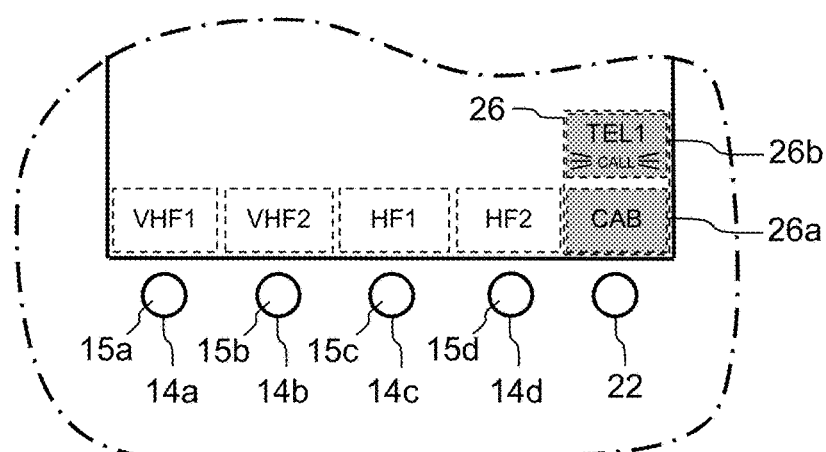
Figure 7B:
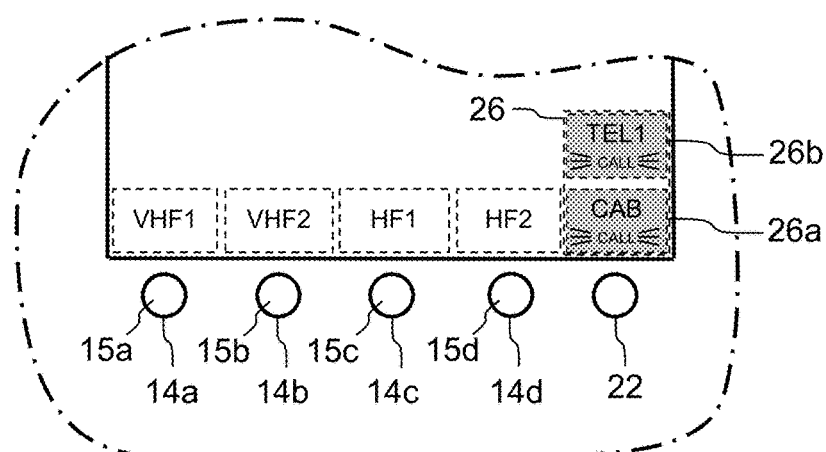

In an advantageous embodiment, the control device 10 comprises a set of buttons 20, called set of call buttons. This set of call buttons comprises at least one transmission button. The control device 10 further comprises a display area 26 on the display screen 35, this display area being associated with the set of call buttons and preferentially arranged facing the set of call buttons. The processing unit 40 is configured to display an indication in the display area associated with the set of call buttons when the communication system receives a call over a communication channel with which no set of buttons is associated and to select this communication channel for transmission following an action of a user on the transmission button of the set of call buttons. Upon the action on the transmission button, the processing unit further activates listening on the communication channel According to a variant button embodiment represented in FIGS. 1a and 1b, the transmission button corresponds to an electromechanical knob 24. According to another variant embodiment represented in FIGS. 2a and 2b, the display screen 35 being a touch screen, the transmission button corresponds to a touch surface superimposed on the display area 26. Advantageously, the set of call buttons further comprises a button 22 for setting sound volume. FIG. 6 illustrates the reception of a call over the communication channel CAB, corresponding to the cabin intercom, in the case where none of the sets of reconfigurable buttons 12a . . . 12d is associated with this communication channel. Upon reception of the call, the processing unit controls the display, in the display area 26, on the one hand of the name of the communication channel, namely CAB, and on the other hand of a "CALL" indication to signal to a pilot that a call is received on this communication channel Advantageously, the display of the "CALL" indication is a blinking display so as to more strongly attract the attention of the pilot. When the pilot presses on the transmission button (electromechanical button 24 or touch area superimposed on the display area 26), the processing unit 40 selects the communication channel CAB for transmission, which allows the pilot to answer the call, and the processing unit controls the stopping of the display of the "CALL" indication. If another communication channel was previously selected for transmission, the transmission over this other communication channel is deselected by the processing unit given that just one communication channel can be selected for transmission at a given instant. The pilot can stop the communication by pressing once again on the transmission button of the set of call buttons. Advantageously, the display area 26 associated with the set of call buttons 20 comprises several display subareas 26a, 26b as represented in FIGS. 7a and 7b and the touch surface comprises several touch subsurfaces each superimposed on a display subarea 26a, 26b. The processing unit 40 is configured in such a way that, when the communication system receives simultaneous calls over several channels with which no set of buttons is associated, the processing unit controls the display of the names of the channels in distinct subareas of the display area and the processing unit activates transmission on one communication channel out of the channels following an action of a user on the touch subsurface superimposed on the display subarea in which the name of the communication channel is displayed. In the example represented in FIGS. 7a and 7b, the communication system receives two simultaneous calls over the communication channels CAB and TEL1 with which none of the sets of buttons 12a . . . 12d is associated upon reception of the calls. More specifically, FIG. 7a represents a case in which the pilot has already answered a call over the communication channel CAB (as indicated previously) and a new call arrives over the channel TEL1. Before the arrival of the new call over the channel TEL1, the processing unit 40 controlled the display of the indication CAB in the display subarea 26a, without controlling a "CALL" indication in the display subarea since the pilot has already answered the call. On the arrival of the new call over the communication channel TEL1, the processing unit further controls the display, in the display subarea 26b, on the one hand of the TEL1 indication and on the other hand of the "CALL" indication to signal the new call over the communication channel TEL1. For its part, FIG. 7b represents a case in which the pilot has not yet answered one of the two calls.

Consequently, the processing unit 40 controls the display of a "CALL" indication in each of the display subareas 26a and 26b.

Figure 5:
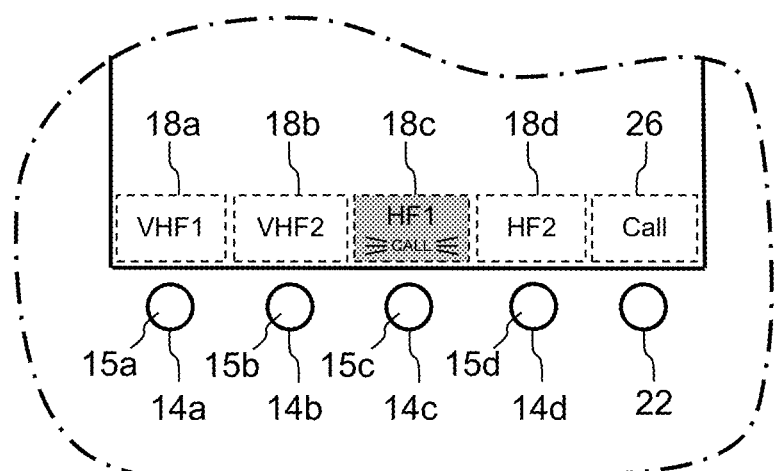

When a call is received by the communication system over a communication channel with which one of the sets of buttons 12a . . . 12d is already associated, the processing unit controls the display of a "CALL" indication in the display area 18a . . . 18d associated with this set of buttons. In the example illustrated by FIG. 5, the set of buttons 12c is associated with the communication channel HF1 and the processing unit controls the display of a "CALL" indication in the display area 18c associated with the set of buttons 12c to signal a call over this communication channel The principle of operation is then similar to that already described for the set of call buttons.

In a variant embodiment, the processing unit is configured to display an indication in the display area 26 associated with the set of call buttons 20 when the communication system receives a call over any channel, even if a set of buttons 12a . . . 12d is already associated with this channel. This simplifies the ergonomy of use of the device by the pilot, since the latter can then always answer a call by performing an action on the transmission button 24 of the set of call buttons.

Figure 8:
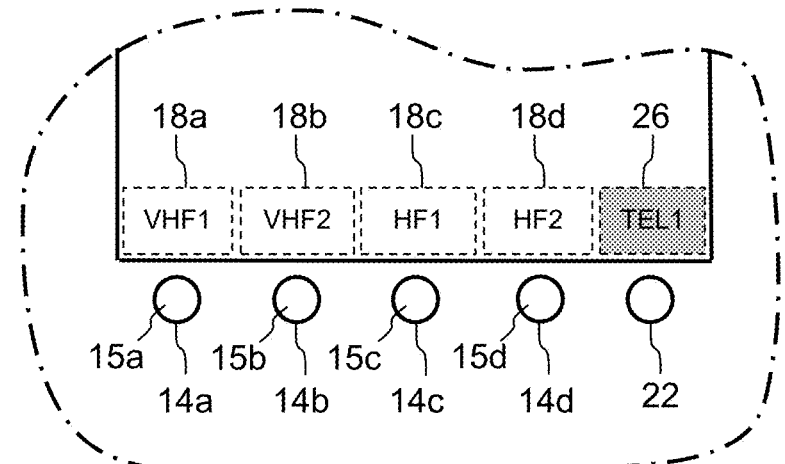

Advantageously, when a user, in particular a pilot, wants to transmit a call over a communication channel with which no communication channel is associated, this communication channel corresponding to a telephone link, the pilot sets the corresponding telephone number in an appropriate menu of the control device 10. This menu corresponds for example to the "TEL" tab of the list of tabs 60 represented in FIG. 4. When the pilot establishes a communication over this telephone link by means of the menu, the processing unit automatically associates the set of call buttons 20 with this communication channel and controls the display of the name of the communication channel (TEL1) in the display area 26 as represented in FIG. 8. The pilot can then set the sound volume in reception by means of the button 22 or even stop the communication by pressing on the transmission button of the set of call buttons, in the same way as if it were a received call.

Figure 9:
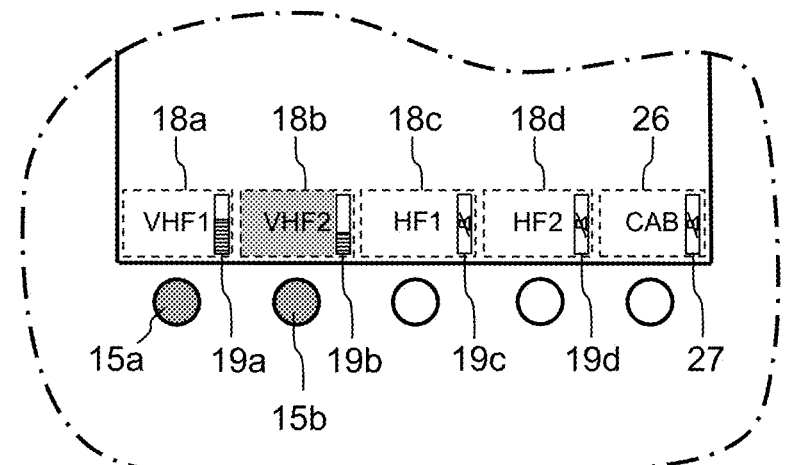

In a particular embodiment, the processing unit 40 further controls the display of a sound volume indicator 19a . . . 19d, or 27 in the display area associated with each set of buttons, as represented in FIG. 9. This sound volume indicator corresponds, for example, to a scale such as a barograph 19a, 19b displayed in proximity to an edge of the corresponding display area. When reception is not activated for a communication channel, the sound volume indicator can correspond to such a barograph displaying a zero value, or even a particular symbol 19c, 19d, 27 signaling that the reception is deactivated.

In another embodiment, that can be combined with the preceding one, a visual indicator is combined with the reception button 15a . . . 15d of each set of buttons. In the example represented in FIG. 9, the visual indicators combined with the reception buttons 15a and 15b are on to signal that the reception of the corresponding communication channels is activated.

Advantageously, when a communication channel is activated for transmission, the processing unit controls the display of a background of a specific color for the display area associated with the set of buttons associated with this communication channel For example, the background of the display area is gray when the display area corresponds to a communication channel not activated for transmission and this background is green when the display area corresponds to a communication channel activated for transmission. Even more advantageously, the processing unit controls the display of a background of another specific color upon the reception of a call over a communication channel, in addition to the display of the "CALL" indication already mentioned.

The functionalities of the transmission, reception and sound volume setting buttons of each of the sets of buttons can be incorporated on one and the same control device without departing from the scope of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control device of a communication system of an aircraft, the communication system having a predefined number of communication channels, the control device comprising:
   a processing unit,
   a display screen, and
   a plurality of sets of buttons, each set of buttons being associated with a communication channel and comprising:
      a button for setting sound volume;
      a reception button, provided for at least one of activating or deactivating listening to the communication channel associated with the set of buttons; and
      a transmission button, provided for at least one of selecting or deselecting the communication channel associated with the set of buttons for transmission,
   wherein
   the number of sets of buttons in said plurality of sets of buttons is at least equal to two and less than the predefined number of communication channels of the communication system,
   the device comprises display areas on the display screen, a display area being associated with each set of buttons, the display area associated with a set of buttons being arranged facing at least one button of the set of buttons and provided to display at least the name of the communication channel associated with the set of buttons, and
   the processing unit is configured to configure the association between each of the sets of buttons and the communication channel associated with this set of buttons in response to actions of a user on at least one interactive element of the device.

2. The device as claimed in claim 1, wherein said at least one interactive element corresponds to the transmission button of the communication channel associated with the set of buttons.

3. The device as claimed in claim 2, wherein the transmission button of the communication channel associated with the set of buttons is an electromechanical button and the processing unit is configured to commence configuration of the communication channel associated with the set of buttons concerned when this electromechanical button is pressed for a duration greater than a predetermined value.

4. The device as claimed in claim 2, wherein the transmission button of the communication channel associated with the set of buttons corresponds to a touch surface superimposed on the display area associated with the set of buttons concerned and the processing unit is configured to commence configuration of the communication channel associated with the set of buttons concerned when a user performs a specific gesture on this touch surface.

5. The device as claimed in claim 1, wherein the device is linked to a pointing device and the processing unit is configured to commence configuration of the association between a set of buttons and the communication channel associated with this set of buttons when a user interacts with the display area associated with the set of buttons concerned by means of the pointing device.

6. The device as claimed in claim 1, wherein the device comprises a set of navigation keys, distinct from the buttons of the various sets of buttons, and the processing unit is configured to commence configuration of the association between a set of buttons and the communication channel associated with this set of buttons when a user presses on a navigation key.

7. The device as claimed in claim 1, wherein the processing unit is configured to display on the display screen a configuration menu, on request from a user, this configuration menu allowing the user to choose from several predefined configurations of the channels associated with the various sets of buttons.

8. The device as claimed in claim 7, wherein the processing unit is configured to allow a user to parameterize at least one of said predefined configurations.

9. The device as claimed in claim 1, further comprising:
   a set of call buttons, this set of call buttons comprising at least one transmission button, and
   a display area on the display screen, this display area being associated with the set of call buttons and arranged facing the set of call buttons, and
   the processing unit is configured to display an indication in the display area associated with the set of call buttons when the communication system receives a call over a communication channel with which none of said plurality of sets of buttons is associated and to select this communication channel for transmission following an action of a user on the transmission button of the set of call buttons.

10. An aircraft comprising a control device of a communication system as claimed in claim 1.

* * * * *